US008503997B2

(12) United States Patent  (10) Patent No.: US 8,503,997 B2
Razoumov et al.  (45) Date of Patent: Aug. 6, 2013

(54) METHOD AND APPARATUS FOR DYNAMICALLY ASSIGNING A MOBILE SERVICE REQUEST TO ANY ONE OF A PLURALITY OF AVAILABLE SERVICE PROVIDERS

(75) Inventors: Leonid Razoumov, Riverdale, NY (US); David Kormann, Morristown, NJ (US); Robert R. Miller, Convent Station, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 377 days.

(21) Appl. No.: 12/874,983

(22) Filed: Sep. 2, 2010

(65) Prior Publication Data

US 2012/0058742 A1  Mar. 8, 2012

(51) Int. Cl.
*H04L 29/06* (2006.01)
*H04M 3/42* (2006.01)
*H04M 11/00* (2006.01)

(52) U.S. Cl.
USPC ............ 455/414.3; 455/414.1; 455/406; 455/445; 379/114.02; 379/114.12

(58) Field of Classification Search
USPC ..................... 379/114.02, 114.12
See application file for complete search history.

(56) References Cited

U.S. PATENT DOCUMENTS

| | | | |
|---|---|---|---|
| 5,917,897 | A | 6/1999 | Johnson et al. |
| 6,285,660 | B1 * | 9/2001 | Ronen ............ 370/259 |
| 7,565,137 | B2 * | 7/2009 | Shaw et al. ........ 455/414.3 |
| 2008/0181116 | A1 * | 7/2008 | Kavanaugh et al. ...... 370/236 |
| 2008/0232574 | A1 | 9/2008 | Baluja et al. |
| 2010/0130177 | A1 | 5/2010 | Ku et al. |

OTHER PUBLICATIONS

Gibney, M.A., et al., Market-Based Call Routing in Telecommunications Networks using Adaptive Pricing and Real Bidding; 15 pages, published 1999.
Hausheer, David, et al., PeerMart: Decentralized Auctions for Bandwidth Trading on Demand; retrieved from Internet on Sep. 1, 2001, http://ercim-news.ercim.eu/peermart-decentralized-auctons-for-bandwidth-trading-on-demand; 3 pages.
Hausheer, David, PeerMart: A Decentralized Auction-based P2P Market; retrieved from Internet on Sep. 1, 2010, http://www.peermart.net; 2 pages.
BoD 2006 Program—CSG; Location: San Francisco Fairmont Hotel; Date: Monday Nov. 27, 2006; retrieved from Internet on Sep. 1, 2010, http://www.csg.uzh.ch/events/bod06/program/; 2 pages.

(Continued)

*Primary Examiner* — Wesley Kim

(57) ABSTRACT

A method, non-transistory computer readable medium and system for dynamically assigning a request for wireless communication service are disclosed. For example, the method receives the request for wireless communication service from a mobile device, and forwards the request to a plurality of wireless network service providers to solicit at least one bid for servicing the request. The method receives the at least one bid from the plurality of wireless network service providers to service the request, and determines by a coordinating device a winning bid from the at least one bid. The method then assigns a wireless network service provider from the plurality of wireless network service providers to service the request, wherein the assigned wireless network service provider is associated with the winning bid.

16 Claims, 5 Drawing Sheets

(56) References Cited

OTHER PUBLICATIONS

Beltran, Fernando, et al.; Information Systems and Operations Management Department University of Auckland Business School; A heuristic approach to revenue maximisation in a competitive bandwidth-on-demand wireless market; 1st IEEE International Workshop on Bandwidth on Demand (BoD 2006), San Francisco, USA, 17 pages, Nov. 27 2006.

Yaeger, F.Scott (FYI-Net, Inc.), Defining Bandwidth: Trading and Discussing Potential Scenarios for Obtaining Bandwidth (ID:NMD0218)t; retrieved from Internet on Sep. 16, 2010, http://www.educause.edu/ir/library/powerpoint/NMD0218.pps; 23 pages.

* cited by examiner

METHOD AND APPARATUS FOR DYNAMICALLY ASSIGNING A MOBILE SERVICE REQUEST TO ANY ONE OF A PLURALITY OF AVAILABLE SERVICE PROVIDERS

The present disclosure relates generally to communication networks and, more particularly, to a method and system for providing provider-neutral optimization of spectrum allocation, e.g., for dynamically assigning a mobile service request of a user to any one of a plurality of available service providers, irrespective as to whether the individual is a subscriber of the selected service provider.

BACKGROUND

Currently, individual cellular network operators do not share users or spectrum in areas of overlapping coverage. For example, users of wireless telecommunications devices are typically associated with a particular wireless network provider (e.g., a user's primary carrier) in an established subscriber-carrier relationship. For example, the user/subscriber pays the carrier an agreed fee and the carrier provides wireless services (e.g., voice, data, Internet access, etc.) in accordance with the agreement. The user is only serviced by his or her primary carrier, even if the user is located in an area that is covered by other providers' wireless networks. As a result, some parts of the spectrum may be overloaded while others are underutilized. Also, at different times and in different geographic locations certain classes of services (e.g., voice, streaming data, peer-to-peer communication, etc.) are better supported by different wireless network operators.

SUMMARY

In one embodiment, the present disclosure discloses a method, a non-transistory computer readable medium and system for dynamically assigning a request for wireless communication service. For example, the method receives the request for wireless communication service from a mobile device, and forwards the request to a plurality of wireless network service providers to solicit at least one bid for servicing the request. The method receives the at least one bid from the plurality of wireless network service providers to service the request, and determines by a coordinating device a winning bid from the at least one bid. The method then assigns a wireless network service provider from the plurality of wireless network service providers to service the request, wherein the assigned wireless network service provider is associated with the winning bid.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, an apparatus and a non-transistory computer readable medium for providing provider-neutral optimization of spectrum allocation. In one embodiment, the present disclosure provides an incentive to various independent service providers, e.g., cellular wireless operators to cooperate on serving individual users, irrespective as to whether the individuals are established customers (i.e., customers having a contractual agreement with the cellular wireless operators) of the cellular wireless operators. This approach achieves better utilization of the existing wireless spectrum, and mitigates and avoids wireless congestion and network overload.

Although the present disclosure is discussed below in the context of wireless access networks, e.g., cellular networks, the present disclosure is not so limited. Namely, the present disclosure can be applied to any type of wireless networks, e.g., wireless wide area networks and the like.

Figure 1:
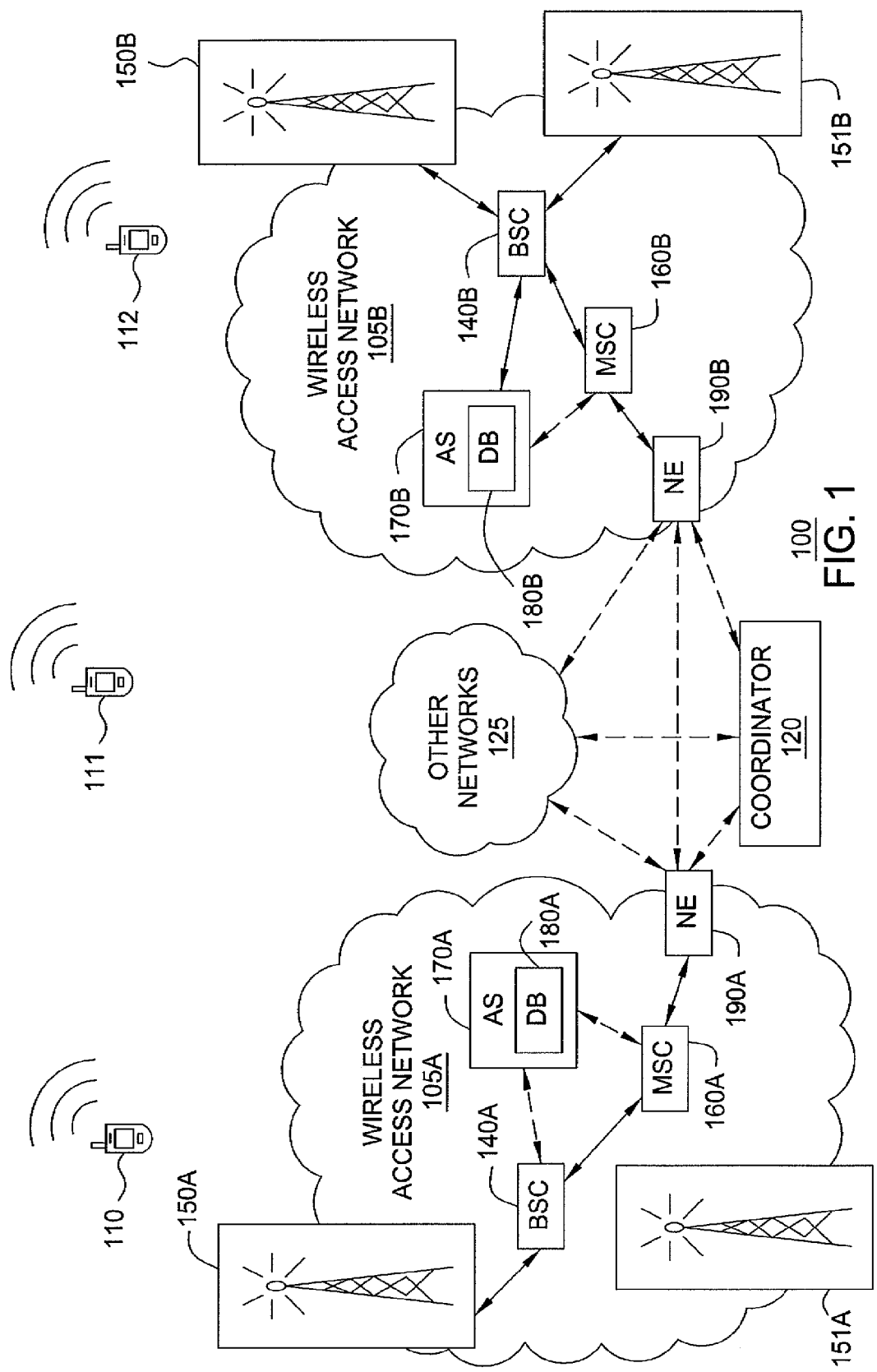
FIG. 1 illustrates an exemplary system related to the present disclosure.

To better understand the present disclosure, FIG. 1 illustrates an example system 100, related to the present disclosure. FIG. 1 illustrates exemplary wireless access networks 105A and 105B, e.g., cellular networks, suitable for implementing embodiments of the present disclosure for providing provider-neutral optimization of spectrum allocation. Wireless access networks 105A and 105B may comprise substantially similar components and functions. Accordingly, where the following discussion refers to a component of wireless access network 105A, it should be understood that the description also applies to a corresponding component in wireless access network 105B.

In one embodiment, wireless access network 105A is configured to facilitate communication between users, such as the users of wireless endpoint devices 110-112, and other wireless access networks, such as wireless access network 150B, other access or core networks 125 which may comprise any packet switched or circuit switched networks, e.g., IP networks, IP Multimedia Subsystem (IMS) networks, Voice over Internet Protocol VoIP) networks, Asynchronous Transfer Mode (ATM) networks, Frame Relay networks, and the like. The wireless endpoint devices 110-112 may comprise any customer endpoint devices configured for wireless communication such as personal computers, laptop computers, Personal Digital Assistants (PDAs), mobile phones, smart phones, email devices, messaging devices, and the like. The physical link between wireless endpoint devices 110-112 and the wireless access network 105A comprises RF signals between the one or more base stations 150A-151A and the wireless endpoint devices 110-112. Here only two base stations 150A and 151A are depicted as part of wireless access network 105A. However, it should be appreciated that the wireless access network 105A may comprise any number of base stations depending upon the size and needs of the network. In addition, although only three wireless endpoint devices 110-112 are depicted, it should be appreciated that any number of users/wireless endpoint devices may be serviced at the same time by wireless access network 105A.

To manage the communications of multiple users serviced by the wireless access network 105A, the wireless access network 105A may comprise one or more network elements.

For example, wireless access network 105A may comprise one or more base station controllers (BSCs) 140A for managing RF communication of the base stations 150A-151A. Although only one BSC 140A is depicted in the wireless access network 105A, it should be understood that various configurations are possible using one or more BCSs. For example, each base station 150A-151A could be serviced by its own BSC. Alternatively, BSC 140A could control a plurality of base stations.

In one embodiment, BSC 140A performs a variety of wireless network management related tasks such as wireless channel assignments, determining transmission power levels, controlling handovers from one base station to another base station, concentrating multiple signals from wireless endpoint devices for onward transmission to other portions of the wireless access network 105A and other networks 125, and others functions. In some embodiments, the BSC 140A may provide transcoding functions between wireless communication formats used by the base stations 150A-151A and wireless endpoint devices 110-112 and Internet protocol (IP) formats used by wireless access network 105A and other networks 125, e.g., one or more external networks. For example, the BSC 140A may forward communications to additional networks via network element (NE) 190A, which may comprise a gateway or border element providing, among other functions, connectivity between the wireless access network 105A, one or more other networks 125, as well as wireless access network 105B.

Each of the base stations 150A-151A comprises, at a minimum, a RF transceiver, and is configured to receive and transmit RF signals to and from wireless endpoint devices (e.g., wireless endpoint devices 110-112 and to communicate with other elements within the wireless access network 105A (e.g., mobile switching center (MSC) 160A, application server 170A, etc.). Base stations 150A-151A may support calls for a plurality of users using wireless endpoint devices 110-112. Although only three wireless endpoint devices are depicted, it should be understood that base stations 150A-151A may support any number of users/wireless endpoint devices. For example, a customary 3G base station transceiver using W-CDMA may be capable of supporting several hundreds of simultaneous calls on each 5 MHz frequency band/spectrum slice that is used.

In one embodiment, wireless access network 105A includes at least one mobile switching center (MSC) 160A. Among other functions, the MSC 160A may maintain user profile records for users/wireless endpoint devices currently serviced by base stations within the portion of the network that is the responsibility of MSC 160A. The MSC may also function as a media gateway and/or media gateway controller facilitating communication between the wireless access network 105A and other networks 125. Thus, the MSC 160A may be responsible for connecting calls from users of mobile endpoint devices 110-112 to other wireless users or to users on other networks 125 such as the IMS networks, PSTN, VoIP networks, asynchronous transfer mode (ATM) or frame relay networks, etc. However, it should be understood that some of the functions described herein with respect to the BSC 150A may be performed by the MSC 160A and vice versa. Those skilled in the art will appreciate that other and different configurations are possible consistent with the teachings herein.

In one embodiment, the wireless access network 105A may also include, an application server (AS) 170A. The application server 170A may include a database (DB) 180A suitable for providing provider-neutral optimization of spectrum allocation, e.g., for dynamically assigning a mobile service request of an individual to any one of a plurality of available service providers (broadly, wireless network service providers), irrespective as to whether the individual is a subscriber of the selected service provider, as will be described in greater detail below. The application server 170A may be configured to provide one or more functions supporting calls via the wireless access network 105A. For example, application server 170A may comprise any server or computer that is well known in the art, and the database 180A may be any type of electronic collection of data that is also well known in the art.

Although the network elements comprising the wireless access network 105A have been described as one or more discrete devices, it should be appreciated that the functionality described with respect to each network element is not limited to the particular device as described and depicted herein. Rather, the embodiment of wireless access network 105A is merely illustrative of one network configuration that is suitable for implementing embodiments of the present disclosure. Thus, any other network elements providing the same functionality described herein with respect to the wireless access network 105A would be equally suitable for use in accordance with embodiments of the present disclosure. Those skilled in the art will realize that the wireless access network 105A may be expanded by including additional endpoint devices, base stations, BSCs, MSCs, network elements, application servers, etc. without altering the scope of the present disclosure.

For example, a home location register (HLR) (not shown) may be located in the wireless access network 105A or connected to the wireless access network 105A and functioning as a central repository of authentication and service validation information, subscription information, and other information pertaining to a user's subscription and service. The HLR may provide such information to the mobile switching center MSC 160A to support the above described functions of the MSC 160A.

Similarly a visiting location register (VLR) (not shown) may be located in the wireless access network 105A or connected to the wireless access network 105A and functioning as a temporary repository of authentication and service validation information, subscription information, and other information pertaining to a visiting user's subscription and service. For example, a home location register may comprise a centralized repository or one or more regionalized repositories serving a wireless network provider's entire network. On the other hand, a visiting location register may be a localized component that temporarily stores a user's subscriber information when the user's wireless endpoint device is located in a particular geographic region serviced by a particular visiting location register. When the user and the endpoint device move from the area, the subscriber information is released from the particular VLR, and another VLR serving the new area in which the user and the wireless endpoint device are located obtains the subscriber information from the HLR. In addition, one or more HLRs and/or VLRs may provide all or a portion of the subscriber information to the relevant MSC or BSC of a wireless access network, e.g., MSC 160A or BSC 140A in FIG. 1 to support the functionalities of the MSC and BSC described above, such as connecting calls from users of mobile endpoint devices to other wireless users or to users on other networks.

As mentioned above, wireless access network 105B may comprise substantially similar components with substantially similar functions to those described in connection with wireless access network 105A. For example, base stations 150B-151B may functional in substantially the same manner as base stations 150A-151A. In addition, BSC 140B, MSC 160B, AS 170B, DB 180B, and NE 190B may function in substantially the same manner as BSC 140A, MSC 160A, AS 170A, DB 180A, and NE 190A respectively. Of course, wireless access networks 105A and 105B may be operated by different network service providers. In addition, each of the network service providers may have a different subscriber base comprising a number of users who subscribe to the services of the respective networks. For example, users of mobile endpoint devices 110 and 111 may be subscribers of the service provider of wireless access network 105A, whereas the user of mobile endpoint device 112 may be a subscriber of the service provider of wireless access network 105B.

Although the above described components and functions have been referred to with particular terms, it should be understood that the particular terms and embodiments depicted in FIG. 1 and described above are not the only embodiments of the present disclosure. For example, although the access networks 105A and 105B have been described as comprising base station controllers 140A and 140B, it should be understood that some wireless access networks may include one or more radio network controllers (RNC) that provide substantially similar functionality to that of a base station controller (BSC). For example, the terms RNC and BSC may often be used interchangeably. In particular, the same component is often referred to as a base station controller (BSC) with respect to 2G/GSM networks, whereas in a 3G/CDMA network, the term radio network controller (RNC) is customarily used. Since the foregoing is provided as an illustrative example only, one of ordinary skill in the art will understand that other components and the terminology used to refer to such components may be used interchangeably with those depicted and described in connection with FIG. 1, depending upon the context and/or the particular network.

Currently, individual wireless network operators, e.g., the operators of wireless access networks 105A and 105B respectively, do not share users (e.g., subscribers) or spectrum in areas of overlapping coverage. For example, a user of wireless telecommunications device is typically associated with a wireless network provider or carrier (e.g., a primary carrier) in a subscriber-carrier relationship according to a subscriber agreement. The user pays the carrier an agreed fee and the carrier provides wireless voice, data and/or other services in accordance with the agreement. The user is only serviced by his or her primary carrier, even if the user is located in an area that is covered by other providers' wireless networks. In other words, it is possible that the user is in an area with overlapping service coverage by a plurality of different service providers.

For example, using the system 100 of FIG. 1 as an illustration, if the user of wireless endpoint device 110 is a subscriber of wireless access network 105A (the "primary carrier") but is in an area of overlapping coverage where wireless access networks 105A and 105B can both provide services, wireless endpoint device 110 will only be serviced by its primary carrier's network, e.g., wireless access network 105A. Wireless access network 105B will not provide service to wireless endpoint device 110 where there is overlapping coverage with the primary carrier's network. Similarly, a user with mobile endpoint device 112 is a subscriber of wireless access network 105B. Even if the mobile endpoint device 112 is in an area that can be served by both wireless access networks 105A and 105B, the mobile endpoint device 112 will not be serviced by wireless access network 105A. It will only be serviced by its primary carrier's network, i.e., wireless access network 105B.

As a result, some parts of the spectrum may be overloaded while others are underutilized in an overlapping coverage area. Also, at different times and in different geographic locations certain classes of service (voice, streaming data, peer-to-peer communications, etc.) are better supported by different wireless network operators. At present, neither users nor wireless network operators benefit from the possibility of exchanging users based on loading state of the networks, real time traffic patterns or user-specified communication requirements.

For example, in one embodiment different wireless network providers providing wireless services in the same geographic area, e.g., an area of overlapping coverage, use different portions of the wireless spectrum. Typically, in the United States, each carrier operating in a geographic region may have an assigned, i.e., leased, portion of spectrum based on what the carrier bid for at a Federal Communications Commission (FCC) auction. This leasing scheme is designed to ensure that there is no interference between different carriers operating in areas of overlapping geographic coverage, assuming that the carriers adhere to the regulatory scheme do not operate outside their respective assigned portions of the spectrum.

Presently wireless network providers, e.g., cellular network operators that provide telecommunications services, operate several diverse types of networks such as CDMA, GSM, EDGE, GPRS, and the like. However, at present, at least in the United States, major carriers are moving towards a standard referred to as Long Term Evolution (LTE), and are harmonizing to the same technology. In addition, the FCC has indicated that an additional 500 MHz of spectrum will be released. The distribution of spectrum will be according to an FCC auction, as has been done in the past. Accordingly, different carriers will own different portions of the spectrum nationwide. For example, different carriers may hold licenses for the same or overlapping portions of spectrum but in different geographic areas.

At different times of day and in different geographic locations, there will be different loads on different portions of the spectrum. For example, some carriers may be overloaded at a particular time of day whereas some carriers may be underutilized and have surplus capacity. In addition, interference in particular frequency bands (e.g., from weather events, authorized or unauthorized man-made interference, etc.), propagation distance to cell site and other factors may affect the ability of a particular carrier to service a communication request from a particular device in a particular location and at a particular time of day. For example, with the amount of wireless data traffic now exceeding that of voice traffic, it may be relatively easy to find additional resources to service a new voice communication request, whereas a new data communication request may be more difficult as a relatively greater quantity of resources must be reserved to service a more bandwidth intense data communication. In addition, there are a multitude of applications that have different quality of service (QoS) requirements.

Accordingly, embodiments of the present disclosure provide a bidding mechanism that allows wireless network providers to make individual instantaneous bids for service for individual users, taking into account the applications the users will be running, the location of the users, and network conditions, among other factors. Specifically, in one embodiment a coordinating device is in communication with several wireless access networks that are all within servicing range of a user making a request for communications service from a wireless endpoint device. The coordinating device may receive the request for communication service from a user's wireless endpoint device either directly from the user's wireless endpoint device or via a wireless access network (e.g., a wireless access network of the user's primary carrier). The coordinating device then solicits and receives bids from the available wireless networks with excess capacity to service the request. Based upon the bids received, the coordinating device then determines a winning bid and assigns the wireless network submitting the winning bid to provide the requested communication service(s).

For example, FIG. 1 illustrates a coordinator module or device 120 in communication with wireless access networks 105A and 105B via network elements 190A and 1908 respectively. The wireless access networks 105A and 105B may provide overlapping coverage to wireless endpoint devices 110-112 such that either one of wireless access networks 105A or 105B could service any one of the wireless endpoint devices 110-112. Although it is shown that the coordinator is capable of communicating directly with the two wireless access networks 105A and 105B, in one embodiment the coordinator 120 may in fact use the other networks 125 to interact with any of the available wireless access networks that have overlapping coverage (i.e., with respect to the wireless endpoint devices 110-112). The coordinator 120 may be configured for providing provider-neutral optimization of spectrum allocation, e.g., for dynamically assigning a mobile service request of an individual to any one of a plurality of available service providers, irrespective as to whether the individual is a subscriber of the selected service provider, as will be described in further detail below with respect to illustrative methods of the present disclosure.

Figure 2:
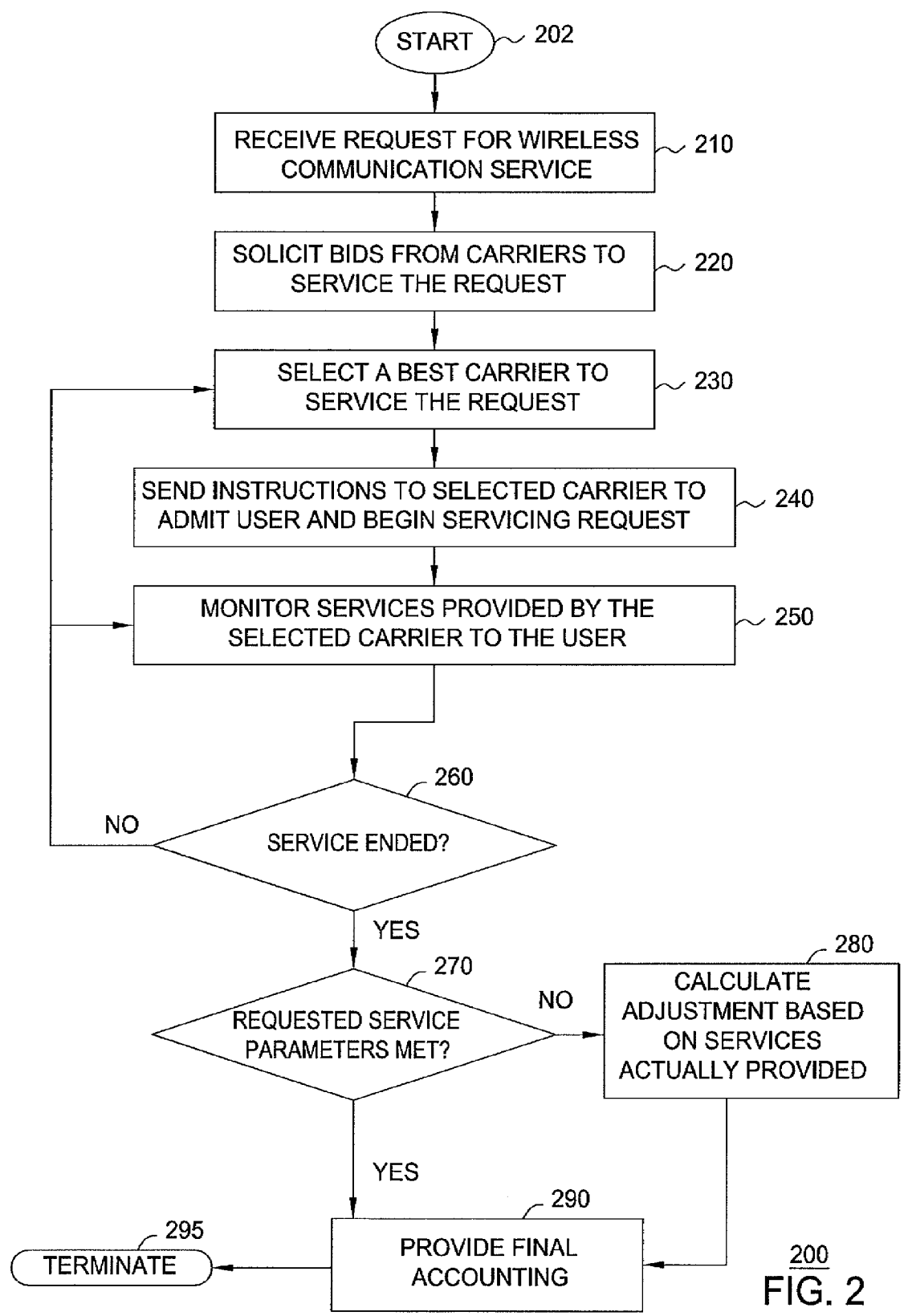
FIG. 2 illustrates a flowchart of a method for dynamically assigning a mobile service request of an individual to any one of a plurality of available service providers.

FIG. 2 illustrates a flowchart of a method 200 for dynamically assigning a mobile service request of an individual to any one of a plurality of available service providers, irrespective as to whether the individual is a subscriber of the selected service provider. The steps of the method 200 may be performed by one or more of the components of the system 100 depicted in FIG. 1. For example, one or more steps of the method 200 may be implemented by the coordinating device 120 or application servers 170A and 170B, base stations 150A-151A and 150B-151B, or base station controllers (BSC) 140A and 140B in FIG. 1. Alternatively, or in addition, one or more steps of the method 200 may be implemented by a general purpose computer having a processor, a memory and input/output devices as illustrated below in FIG. 5. For illustrative purposes, the method will now be described in terms of an embodiment where steps of the method are performed at the coordinating device 120 in FIG. 1.

The method 200 initializes in step 202 and proceeds to step 210. At step 210, the method receives a request for wireless communication service from a mobile device, e.g., a wireless endpoint device such as any of the wireless endpoint devices 110-112 in FIG. 1. For example, a user of a mobile device may wish to engage in a communication session with particular requirements. For example, if a user desires to engage in a data communication session, e.g., downloading a streaming live video, the desired communication session may have strict parameters which must be met in order to provide the service. For example, a number of parameters/factors, such as the necessary bandwidth, the anticipated duration of the service, and one or more quality of service (QoS) parameters, such as throughput, jitter, maximum latency, error rate, loss ratio, may be provided by a user making a request for a communication session via a mobile device. The user may specify such factors explicitly, e.g., via keypad entries on the mobile device or spoken commands with a voice command function of the mobile device. Alternatively, the mobile device may specify the factors based upon the user preference profile. For example, the mobile device may automatically specify the minimum requirements necessary based upon the type of communication being requested by the user. For example, where the user is requesting a communication involving streaming video, the mobile device may specify a low maximum latency and high throughput, but provide a greater tolerance with respect to a loss ratio. On the other hand, if the request is for a voice communication session, the mobile device may specify a lower jitter rate and loss ratio, since degradations in these parameters are perceived more acutely by users engaged in voice communications as compared to users who are downloading pictures or video and suffer similar degradations. These requirements can be established in the user preference profile by the user and/or automatically by the endpoint device, e.g., the operating capabilities of the endpoint device itself can be used as defaults for various parameters, e.g., resolution of the display on the endpoint device, the communication protocols employed by the endpoint device, the encoders/decoders supported by the endpoint device, and so on.

In one embodiment, the method 200 receives the communication service request directly from a user's mobile endpoint device. For example, a coordinating device in a certain area may operate on a particular portion of the wireless spectrum that is made known to the users and to the wireless access network providers. The user's mobile device may be configured to automatically, or in response to a user-initiated action, transmit a communication service request to the coordinating device by transmitting the request via the appropriate portion of the wireless spectrum.

In another embodiment, the method 200 receives the communication service request via a wireless access network (e.g., the wireless access network of the user's primary carrier). For example, with reference to FIG. 1, a user with wireless endpoint device 110 may be a subscriber of wireless access network 105A. Accordingly, wireless network 105A may be configured to receive a request for communication services from wireless endpoint device 110 and to forward the request to coordinator 120. For example, the communication request from wireless endpoint device 110 may be received over-the-air by base station 150A and forwarded to the base station controller (BSC) 140A. BSC 140A, in consultation with application server 170A may determine that the communication is a request intended for the coordinator 120 in accordance with the present disclosure. Accordingly, the base station controller may forward the request to mobile switching center 160A for onward transmission to the coordinator 120 via network element 190A.

In any event, the user's communication service request is received by the method 200 and is further processed. For example, the method 200 may review the parameters of the communication request, such as the type of communication request (e.g., voice, data, streaming video, etc.), the location of the mobile device, the necessary bandwidth, the anticipated duration of the service, and one or more quality of service (QoS) parameters, such as throughput, jitter, maximum latency, error rate, and loss ratio. In one embodiment, the communication request is received in a standard predefined message type. In another embodiment, the communication request may be in one or more diverse formats. In the latter case, the method may translate the communication request into a common format.

At step 220, the method 200 solicits bids from a number of available carriers, e.g., wireless access network providers that can potentially service the communication request from the user. For example, the method may query a number of wireless access networks in the vicinity of the mobile device to determine which wireless networks, if any, are in range to service the communication request from the mobile device, which of the wireless networks in range, if any, have the capacity to service the request, and at what cost each of the wireless networks is willing to service the communication request based on the requirements specified in the request.

In one embodiment, the method reformats the received communication service request into a bid solicitation. For example, in one embodiment, if a communication service request is received via a wireless access network that is a primary carrier of a requesting user, the method may hide the fact that the request is originating from a subscriber of a particular primary carrier. In one embodiment, the bid solicitation is the same or substantially similar to the communication service request received. For example, the communication service request may be received by a coordinating device comprising various parameters, such as the type of communication request (e.g., voice, data, streaming video, etc.), the location of the mobile device, the necessary bandwidth, the anticipated duration of the service, and one or more quality of service (QoS) parameters, such as throughput, jitter, maximum latency, error rate, and loss ratio, etc. Similarly, the bid solicitation request may include all or a portion of the parameters included in the communication service request. In one embodiment, the bid solicitation request may include an expiration time, after which the method will not accept responses to the bid solicitation.

In one embodiment, the method solicits bids from a number of available wireless network providers by forwarding the bid solicitation to those wireless networks that can potentially service the communication request. For example, if the wireless endpoint device of a requesting user is determined to be in a particular geographic region based upon information received in the communication service request, or as determined via other means, the method would not solicit bids from wireless access networks that are not servicing the vicinity of the wireless endpoint device. In addition, the method 200 may be in periodic contact with one or more wireless access networks that can potentially service the communication request. Accordingly, the method 200 may already know that a certain wireless access network is at or near capacity, or is not willing to accept such requests at this time, based upon an earlier exchange with the wireless access network. In such a situation, the method 200 may not send a bid solicitation to this particular wireless access network. Similarly, if a user, via his or her wireless endpoint device, is requesting to communicate using a newer standard/protocol such as Long Term Evolution (LTE), and a potentially serving wireless access network only supports older standards/protocols, such as 3G, the method 200 may not solicit a bid from this particular wireless access network.

In the example of FIG. 1, if the coordinator 120 receives a communication request from mobile device 111, the coordinator 120 may send a copy of the bid solicitation to each of wireless access networks 105A and 105B. In response, each of the wireless access networks 105A and 105B may respond indicating whether the network is able to service the communication request and if so, at what price the network is willing to perform the service.

At step 230, the method 200 determines the best network service provider to service the communication request. For example, the method 200 may review all responses to the bid solicitation received at step 220 in response to the sending-out of the bid solicitation. In one embodiment, the method 200 simply selects the lowest cost offer submitted in response to the bid solicitation. In another embodiment, the method 200 may consider additional factors, besides cost, in determining the best wireless access network to service the communication request. For example, a communication service request may specify a particular minimum bandwidth requirement. Accordingly, all of the offers received from potentially serving wireless access networks must guarantee that the service will meet this minimum bandwidth requirement. However, in some instances a wireless access network that is submitting a bid may have excess bandwidth capacity that allows it to exceed the minimum requested bandwidth. In addition, the network may specify the superior bandwidth offer, which it is willing to guarantee for a particular price, in its submitted bid. Thus, in one embodiment, the method 200 may consider additional factors, such as superior bandwidth offers, for example, in determining the best carrier to service the communication request. Regardless of the exact manner in which the determination is made, the method 200 selects the best offer in response to the bid solicitation.

In step 240, the method 200 instructs the carrier that submitted the winning bid to admit the user and begin servicing the communication request. In addition to sending instructions to the winning bidder to service the communication request, the method may send certain information necessary for the carrier to carry out the service. For example, the method may transmit one or more user and/or device identifiers, such as a telephone number, a device serial number, a user ID, etc. In addition, the method may convey or more fields of a user service profile associated with the requesting user and the user's wireless endpoint device.

At step 250, the method 200 monitors the services provided by the servicing carrier (e.g., the carrier selected by the method 200 at step 240) to the user. In particular, although all bidding carriers guarantee that they can meet the minimum service requirements specified in the service request and bid solicitation, in some instances the provided service may not meet these expectations. This monitoring mechanism may dissuade carriers from submitting bids to perform services that they cannot provide. In addition, even where a carrier fails to meet a required level of service inadvertently, e.g., through unanticipated failure events and the like, this mechanism may prevent a user from paying for services that were not provided. In one embodiment, the method 200 receives one or more service reports from the servicing carrier related to the communication service. In one embodiment, the method receives a single service report from the servicing carrier following the end of the communication service. In another embodiment, the method 200 receives periodic service reports from the servicing carrier, e.g., while the communication session for the user is still ongoing.

In one embodiment, upon detection by the coordinating device 120 that the assigned wireless network service provider is not meeting the required parameter associated with the requested service, the coordinating device 120 will issue a request on behalf of the user to the assigned wireless network service provider to take immediate remedial action to meet the required parameter. For example, the assigned wireless network service provider may be providing the requested service (e.g., delivering the requested content) at a lower quality of service than previously requested by the user when the assigned wireless network service provider provided the winning bid. As such, the assigned wireless network service provider is given a warning and an opportunity to remedy the problem. If the assigned wireless network service provider cannot remedy the problem, the coordinating device 120 will notify the user with a notification message. For example, the coordinating device 120 will send a notification that the assigned wireless network service provider is not meeting the required parameter.

In one embodiment, the user can provide feedback to the notification, e.g., informing the coordinating device 120 to seek another bid from other service providers or carriers, or the user may simply accept the lower quality of service, but will rely on the coordinating device 120 to make the necessary accounting adjustments to address the failure of the assigned wireless network service provider to meet the required parameter. Alternatively, the user's endpoint device can be implemented with a mobile agent (e.g., a software module) that can answer on behalf of the user. For example, the mobile agent can be configured to accept a tolerance of +/−10% of the required parameter. It should be noted that the percentage of tolerance can be selectively set by the user and the above example is only illustrative. Thus, the user can preset certain parameters in advance so that the user will not be interrupted repeatedly during the communication session. However, if the non-compliance is sufficiently large, then the mobile agent may seek input directly from the user.

In one embodiment, if the user directs the coordinating device 120 to seek bids from other service providers, the coordinating device 120 will resubmit the previous request as discuss in step 220. However, the coordinating device 120 may exclude bids from the previously assigned wireless network service provider given that it is aware that the previously assigned wireless network service provider cannot meet the requested required parameter at the present time. Once another winning bid is acquired, the coordinating device 120 will reassign the requested service to the newly assigned wireless network service provider. The user will be informed since the service may be temporarily interrupted while the newly assigned wireless network service provider starts to provide the requested service. Thus, the coordinating device 120 provides the monitoring function of ensuring that the assigned wireless network service provider is actually providing the service at the required parameter. Thus, the coordinating device 120 is providing an important function that is in addition to the function of simply soliciting bids from a plurality of service providers. This approach alleviates the user from having to solicit bids directly from the user's endpoint device and to monitor the delivered quality of service directly at the user's endpoint device. In this approach, the coordinating device 120 seamlessly assigns a wireless network service provider and then continuously monitors the assigned wireless network service provider's performance. Finally, as discussed above, the coordinating device 120 may receive performance reports directly from the assigned wireless network service provider. However, it is within the scope of the present disclosure that the coordinating device 120 may actively probe the performance of the assigned wireless network service provider, e.g., sending probe packets to the assigned wireless network service provider to measure one or more performance parameters or the coordinating device 120 may passively measure one or more performance parameters directly from the data flow itself, e.g., the data flow associated with the required service.

At step 260, the method 200 determines if the communication service has ended. In one embodiment, the method 200 receives a final service report from the servicing carrier which indicates that the service is completed/terminated. In another embodiment, the method 200 sends periodic query messages to the servicing carrier to determine whether the service is ongoing or terminated.

If the method 200 determines that the service is terminated, the method proceeds to step 270, which is described in further detail below. If the method 200 determines that service is still ongoing, the method may return to steps 230 or 250.

In one embodiment, if the service is ongoing, the method 200 simply returns to step 250 to continue to monitor the services provided by the servicing carrier to the user. For example, the method 200 may continue to receive periodic service reports from the servicing carrier and continue to monitor whether the level of service being provided continues to meet the level of service specified in the service request and bid solicitation.

In one embodiment, the method 200 may return to step 230 if the service is still ongoing. For example, a user may have requested to receive a live streaming video of a several-hour long sporting event. Upon receiving such a request, the method 200 may have solicited bids to service the communication request, selected a winning bidder and assigned the winner to service the request. In addition, the user may be receiving transmission of the live video from the servicing carrier for a substantial period of time. However, because the sporting event is several hours in duration, the user may change location, the network conditions of the servicing carrier may have changed substantially, or a multitude of other circumstances may have changed. Accordingly, the method 200 may return to step 230 to recalculate which is the best carrier to continue the service the communication request.

In one embodiment, the method 200 re-evaluates the submitted bids in view of the changed circumstances on an ongoing basis. For example, if the user has changed location and a previously losing bidder only lost because the winning bidder was better situated geographically, the method may now determine that the losing bidder is now the better carrier to service the request and may reassign the service request to this carrier. In another embodiment, the method 200 sends an additional round of bid solicitations to a number of wireless access networks that can potentially service the communication request. In one embodiment, the method 200 transmits new bid solicitations to the original group of wireless networks that were sent bid solicitations. In another embodiment, the method 200 re-evaluates which wireless networks can potentially service the communication request and transmits new bid solicitations only to such networks. In one embodiment, the original winning carrier continues to service the communication request while the re-bidding process takes place. In any event, the method 200 determines the best carrier to service the communication request, as described above.

In one embodiment, the method 200 may take into account that a certain wireless access network is already servicing the communication request. For example, the method 200 may consider as an additional factor weighing in favor of a bid submitted by the currently serving carrier that the carrier is already servicing the request. This preference may serve to prevent temporary service interruption in switching the user to a new serving carrier unless the benefits of the change are substantial enough.

In one embodiment, if the currently serving carrier is not determined to be the best carrier to service the request, based upon the bids received during the re-bidding process, the method 200 may send instructions to the currently serving carrier to terminate the service and send a final report outlining the details of the actual service provided. In addition, the method 200 may again proceed to step 240 and send instructions to the new winning bidder to admit the user and begin servicing the request from that point.

If at step 260, the method 200 determines that the service is ended, the method proceeds to step 270 to determine if the requested service parameters have been met. For example, the method 200 may receive a final service report from the servicing carrier that provides details pertaining to the actual level of services provided. For instance, the final service report may indicate the type of communication format, the channel type, bandwidth utilization, and various other parameters pertaining to the provided communication service. Upon receiving the final service report, the method 200 may compare the parameters noted in the report with the parameters requested in the bid solicitation to determine that the minimum and/or maximum requirements specified in the bid solicitation have been met or exceed.

In another embodiment, the method 200 may have been monitoring the services provided by the selected carrier periodically during the course of the service. Upon receiving notification or otherwise determining that the service is terminated, the method 200 may simply conclude that the requested parameters have been met, if the method determined that requested parameters were met throughout the duration of the service.

If the method 200 determines that the requested service parameters have been met, the method proceeds to step 290 to provide a final accounting. For example, the winning bid will have indicated a particular cost for which the winning carrier would service the communication request in accordance with the parameters specified in the bid solicitation. If the service has been provided by the winning carrier in accordance with the terms/parameters, then the carrier is entitled to be compensated according to the terms of the winning bid. In one embodiment, the method 200 sends a credit/debit message to the servicing carrier that indicates it is to receive a credit for services. In addition, in one embodiment the method 200 send the same or a similar message to the user and or the user's primary carrier indicating that a payment for services is required. For example, in one embodiment a user has as subscription, e.g., a fee subscription for monthly communication services from a primary carrier. The user may agree to pay a flat monthly fee for which the primary carrier guarantees to the user a certain number of minutes of voice/data and/or other communication without any additional fees. However, the agreement may also allow for the user to obtain communications services from other carriers, such as by way of the method 200. In addition, the agreement may provide that the primary carrier will perform accounting/settlement with the method 200 and/or the other wireless networks that may service the communication requests. The primary carrier may then send a monthly bill to the user that includes, in addition to the flat fee charges, charges for additional services, e.g., including any services obtained from other carrier in accordance with the method 200. Accordingly, the method 200 may send a credit/debit message to the primary carrier of the requesting user in order that the primary carrier can forward payment to the servicing carrier. In addition, at step 290, the method 200 may confirm that proper payment has been made. For example, the method 200 may receive a funds-sent message from the requesting user's primary carrier and a funds-received message from the servicing carrier confirming settlement of the charges per the terms of the credit/debit message(s).

At step 295, the method terminates.

Returning to step 270, if the method 200 determines that the requested service parameters were not met, the method proceeds to step 280 to calculate a billing adjustment. For example, in one embodiment if the requested service parameters are not met, the method 200 may determine that the user should not be charged the previously agreed amount.

In one embodiment, a number of rules may be specified by which a carrier will or will not receive payment, or by which billing adjustments will be calculated. For example, a number of rules may be determined in advance, e.g., by agreement between carriers and/or the coordinating device participating in the bidding scheme embodied in the method 200. For instance, billing adjustment rules may specify that where a user prematurely terminates the communication services being provided due to requested service parameters being unmet, the carrier should not receive any compensation.

Alternatively, billing adjustment rules may specify that where service is terminated earlier than the minimum duration requested, for any reasons beyond the user's control, the carrier will be compensated pro rata for the actual duration of the services provided less a deduction due to the user suffering a service interruption while another carrier is found to handle the remainder of the communication service request. Similarly, the billing adjustment rules may also specify that where a user terminates a service earlier than the minimum duration of time specified in the communication service request, the carrier may be compensated pro rata for the duration of time the services were actually provided, plus an additional credit to the carrier for the loss of revenue due to the carrier losing the opportunity to provide the full length of service originally requested. On the other hand, the same rule could specify that where a user terminates the communication service early, and there is no indication that the carrier failed to meet the requested service parameters, the carrier will still be compensated in the full amount of the bid. The foregoing examples are provided for illustrative purposes only. It should be understood that any types of billing adjustment rules are possible in accordance with various embodiments of the disclosure. In any case, when an adjustment is calculated by the method 200 at step 280, the method proceeds to step 290 where a final accounting is provided.

As described above, when the method 200 completes a final accounting at step 290, the method terminates at step 295.

Although steps of the exemplary method 200 have been described as taking place at, or being performed by a coordinating device, such as coordinator 120 in FIG. 1, it should be understood that some or all of the steps may take place at, or be performed by, any other component of the system in FIG. 1. In addition, although not specifically specified, one or more steps of method 200 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 2 that recite a determining operation or involve a decision do not necessarily require that both branches of the determining operation be practiced. In other words, one of the branches of the determining operation can be deemed as an optional step.

Figure 3:
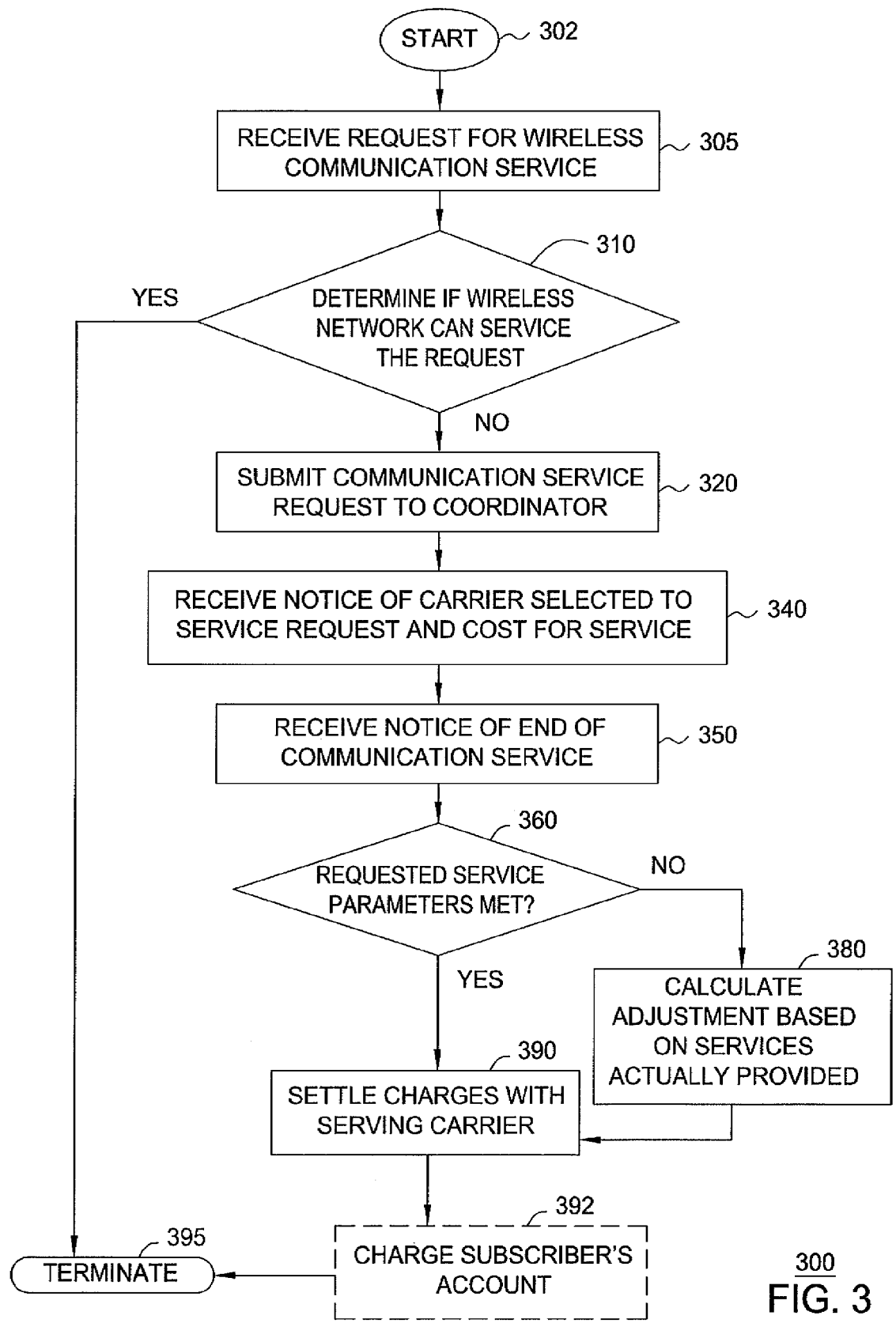
FIG. 3 illustrates a flowchart of a method for dynamically servicing a mobile service request of an individual.

FIG. 3 illustrates a flowchart of a method for dynamically servicing a mobile service request of an individual. The steps of the method 300 may be performed by any one or more of the components of the system 100 depicted in FIG. 1. For example, one or more steps of the method 300 may be implemented by one or more of the components of a wireless access network, such as one of wireless access network 105A or 105B, including application servers 170A and 170B, mobile switching centers 160A and 160B, base stations 150A-151A and 150B-151B, or base station controllers 140A and 140B in FIG. 1. Alternatively, or in addition, one or more steps of the method 300 may be implemented by a general purpose computer having a processor, a memory and input/output devices as illustrated below in FIG. 5. Thus, the method will now be described in terms of an embodiment where steps of the method are performed at an application server, such as application server 170A in FIG. 1.

The method 300 initializes in step 302 and proceeds to step 305. At step 305, the method 300 receives a request for wireless communication service from a mobile device, e.g., a wireless endpoint device such as any of wireless endpoint devices 110-112 in FIG. 1. For example, a user of a mobile device may wish to engage in a communication session with particular requirements. For example, if a user desires to engage in a data communication session, e.g., downloading a streaming live video, the desired communication session may have strict parameters which must be met in order to provide the service. For example a number of parameters/factors, such as the necessary bandwidth, the anticipated duration of the service, and one or more quality of service (QoS) parameters, such as throughput, jitter, maximum latency, error rate, loss ratio, may be provided by a user making a request for a communication session via a mobile device. The user may specify such factors explicitly, e.g., via keypad entries on the mobile device or spoken commands with a voice command function of the mobile device. Alternatively, the mobile device may specify the factors based upon the user demand. For example, the mobile device may automatically specify the minimum requirements necessary based upon the type of communication being requested by the user. For example, where the user is requesting a communication involving streaming video, the mobile device may specify a low maximum latency and high throughput, but provide a greater tolerance with respect to a loss ratio. On the other hand, if the request is for a voice communication session, the mobile device may specify a lower jitter rate and loss ratio, since degradations in these parameters are perceived more acutely by users engaged in voice communications as compared to users who are downloading pictures or video and suffer similar degradations.

In one embodiment, the method 300 receives the communication service request directly from a user's mobile endpoint device. For example, in the system 100 of FIG. 1, application server 170A in wireless access network 105A may receive the communication service request from wireless endpoint device 110 over-the-air via an RF connection between the wireless endpoint device and base station 150A and base station controller 140A. In addition, wireless access network 105A may be the primary carrier of the user of wireless endpoint device 110 (e.g., the user 110 and the provider of wireless access network 105A have a subscriber-carrier relationship). Upon receiving the communication service request, the method 300 may authenticate and or register the user. For example, if the user has just entered the service area of wireless access network 105A, the method 300 may first confirm that the user is a subscriber of the network service provider. For example, BSC 140A may query the MSC 160A for a user profile pertaining to the requesting user based on the mobile endpoint device user identification (UID), telephone number and/or other identifier. If a match is found, the user is registered and/or authenticated and authorized to obtain services and otherwise communicate over wireless access network 105A.

At step 310, the method 300 determines if the primary carrier can service the communication request. For example, user 110 may submit a communication service request to his/her primary carrier (e.g., wireless access network 105A) and the request may be for simple domestic voice communication services without any additional service features required. In addition, wireless access network 105A may be in a low-load condition and well positioned to service the communication request. Accordingly, in one embodiment, if the method 300 determines that the primary carrier can service the communication request, the primary carrier (e.g., wireless access network 105A) simply services the communication request. In this case, the method 300 skips to step 395 where the method terminates.

On the other hand, the method 300 may review the parameters of the communication service request, such as the type of communication request (e.g., voice, data, streaming video, etc.), the location of the mobile endpoint device, the necessary bandwidth, the anticipated duration of the service, and one or more quality of service (QoS) parameters, such as throughput, jitter, maximum latency, error rate, and loss ratio, and may determine that the primary carrier cannot service the request according to the desired parameters. For example, a user may request a high-definition live streaming video of two hours duration. However, the primary carrier network in the vicinity of the user may be in a high-load condition. For example, wireless access network 105A may be the primary carrier of wireless endpoint device 110 making the request for a high-definition live streaming video of two hours duration. However, wireless access network 105A may already be servicing a large number of users who are engaged in other resource-demanding communications/applications. Accordingly, the wireless access network 105A may be determined to be unable to service the user's request at the present time. In a situation such as this, if the method 300 determines that the user's primary carrier cannot service the present communication request, the method proceeds to step 320.

At step 320, the method 300 submits the communication service request for bidding from other carriers. For example, the method 300 may submit the communications service request to a coordinating device, such as coordinator 120 in FIG. 1, to implement a bidding process from other carriers (e.g., other available wireless access network providers). Alternatively, the method 300 may solicit bids directly from other providers. For example, the provider of wireless access network 105A may have one or more bilateral or multilateral agreements with other wireless access networks whereby the networks can solicit bids and exchange subscriber requests with one another according to a bidding process that may be the same as, or substantially similar to the bidding process described in the method 200 of FIG. 2. Thus, for example, such a bidding process may be performed by one or more components of a primary carrier's network (as opposed to being performed by a coordinating device). In fact, in one alternate embodiment, a coordinator 120 can be deployed in each of the service provider network. Furthermore, any one or more of the components of wireless access network 105A in FIG. 1 could perform all or any portion of such a bidding process. Notwithstanding, for illustrative purposes in describing the exemplary method 300, it is assumed that a communication service request is submitted externally, e.g., to a coordinating device, such as coordinator 120 in FIG. 1 to carry out the bidding process. It is further assumed that the bidding process takes place substantially as described above in connection with the method 200 of FIG. 2.

At step 340, the method 300 receives notification of the carrier selected to service the communication request in response to the submission of the communication service request to the coordinating device for bidding. For instance, wireless access network 105A may have forwarded a communication service request from wireless endpoint device 110 to coordinator 120. Coordinator 120 may have submitted the communication service request to a number of potentially serving wireless access networks via a bid solicitation. In addition, after collecting a number of bids, coordinator 120 may have determined that wireless access network 105B is the best carrier to service the request. For example, wireless access network 105B may have submitted the lowest cost bid, or submitted the best overall bid based upon a number of criteria. Accordingly, the method 300 may receive a message, e.g., from coordinator 120, indicating the selected carrier to service the communication request (e.g., wireless access network 105B). The message may further indicate the terms of service and the cost.

In one embodiment, the method 300 may optionally have an opportunity to reject the winning bid. For example, even if a carrier submits a lowest cost/winning bid, the terms may still be usurious (e.g., where only a few bids are received, the process may be non-competitive). In one embodiment, the method 300 may forward the terms of the winning bid to the requesting user for acceptance. The user may then respond either accepting or rejecting the offer of the winning bid. Accordingly, the method 300 may respond, e.g., to a coordinating device such as coordinator 120 in FIG. 1 rejecting or accepting the winning bid, e.g., on behalf of the user. If rejected, the method 300 may skip to step 395 where the method terminates. Of course, if a user is unsatisfied with even the best bid, the user is free to re-characterize the request in another iteration of the method 300. For example, the user could submit a new communication service request with a lower video quality requirement in an effort to obtain lower priced bids from carriers to service a request for streaming video.

If however, the winning bid is accepted by the method 300 at step 340, the user is admitted and the requested services are provided by the wireless access network of the winning bidder (e.g., wireless endpoint device 110 may be admitted and serviced by wireless access network 105B). In one embodiment, the servicing carrier obtains a service profile of the user in order to execute the communication service request. For example, the method 300 may transmit all or a portion of a user service profile to the coordinating device for forwarding to the servicing carrier, or may transmit all or a portion of the user service profile directly to the servicing carrier when the identity of the servicing carrier is discovered at step 340. For instance, the method 300 may transmit one or more user and/or device identifiers, such as a telephone number, a device serial number, a user ID, etc.

At step 350, the method 300 receives a notification that the communication service has ended. For example, the method 300 may receive a final service report from the servicing carrier which indicates that the service is completed/terminated. In one embodiment, the method 300 receives a final service report directly from the servicing carrier. In another embodiment, the method 300 receives a final service report from a coordinating device (e.g., coordinating device 120 in FIG. 1). In yet another embodiment, the method 300 may determine automatically that the service has ended. For example, the method 300 may begin receiving new communication requests from the same user.

The method proceeds to step 360 to determine if the requested service parameters have been met. For example, the method 300 may receive a final service report from the servicing carrier that provides details pertaining to the actual level of services provided. For instance, the final service report may indicate the type of communication format, the channel type, bandwidth utilization, and various other parameters pertaining to the provided communication service. Upon receiving the final service report, the method 300 may compare the parameters noted in the report with the parameters requested in the bid solicitation and/or communication service request to determine that the minimum and/or maximum requirements specified in the communication service request and/or bid solicitation have been met or exceed. In one embodiment, the method 300 simply receives a pre-computed report that details whether the requested service parameters were met. For example, the method 300 may simultaneously receive a notification from a coordinating device that the service has ended, along with a report that indicates that the service parameters either were or were not met. The method 300 may also simply receive a credit/debit message indicating the charges to be settled with the servicing carrier. This message may be in addition to, or as an alternative to the service report and/or notification of the termination of service mentioned above.

If the method 300 determines that the requested service parameters were met, the method proceeds to step 390 to provide a final accounting. For example, the winning bid would have indicated a particular cost for which the winning carrier would service the communication request in accordance with the parameters specified in the bid solicitation. If the service has been provided by the winning carrier in accordance with the terms/parameters, then the carrier is entitled to be compensated according to the terms of the winning bid. Thus, in one embodiment, the method 300 may receive a credit/debit message indicating that a payment for services is required. For example, in one embodiment a user has a subscription, e.g., a fee subscription for monthly communication services from a primary carrier. The user may agree to pay a flat monthly fee for which the primary carrier guarantees to the user a certain number of minutes of voice/data and/or other communication without any additional fees. However, the agreement may also allow for the user to obtain communications services from other carriers. In addition, the agreement may provide that the primary carrier will perform accounting/settlement with other servicing carriers. The primary carrier may then send a monthly bill to the user that includes, in addition to the flat fee charges, charges for additional services, e.g., including any services obtained from another carrier in accordance with the method 300. Accordingly, the method 300 may receive a credit/debit message requesting that payment be forwarded to the servicing carrier. In addition, at step 390, the method 300 may transmit payment to the servicing carrier in accordance with the terms of the winning bid and/or the credit/debit message.

Returning to step 360, if the method 300 determines that the requested service parameters were not met, the method proceeds to step 380 to calculate a billing adjustment. For example, in one embodiment if the requested service parameters are not met, the method 300 may determine that the user should not be charged. Alternatively, or in addition, the method 300 may determine that previously agreed upon charge should be reduced, for example where a communication service request is prematurely terminated. In any case, when an adjustment is calculated by the method 300 at step 380, the method proceeds to step 390 where charges are settled with the servicing carrier.

When the method 300 settles charges with a servicing carrier at step 390, the method proceed to step 392. In step 392, the method 300 may charge a user's account for the requested communication service. For example, if a user's primary carrier settles charges from another carrier that serviced the user's communication request, the primary carrier may obtain reimbursement from the user by debiting the user's account, if there is a credit with the primary carrier, or adding the charges to a next invoice, e.g., a monthly subscriber bill, or the like. When the user's account is charged by the method 300 at step 392, the method proceeds to step 395 where the method terminates.

It should be noted that in one embodiment, a user's primary carrier may also submit a communication service request for bidding, e.g., at step 320, without any specific request on the part of the user. For example, the user's communication service request may not fall within the range of service parameters already guaranteed by the primary carrier to the user per the terms of a subscriber agreement, e.g., a monthly flat-fee. However, the network has capacity to provide the requested service at a premium rate or for an additional charge that is in addition to the monthly flat-fee. Accordingly, the primary carrier may also provide a bid in response to the user request. If the service provider that received the initial user request is selected as the winning bidder, then the service provider will service the user request without forwarding the request to another service provider.

Although steps of the exemplary method 300 have been described as taking place at, or being performed by an application server, such as application server 170A in wireless access network 105A in FIG. 1, it should be understood that some or all of the steps may take place at, or be performed by, any other component of the system in FIG. 1. In addition, although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 that recite a determining operation or involve a decision do not necessarily require that both branches of the determining operation be practiced. In other words, one of the branches of the determining operation can be deemed as an optional step.

Figure 4:
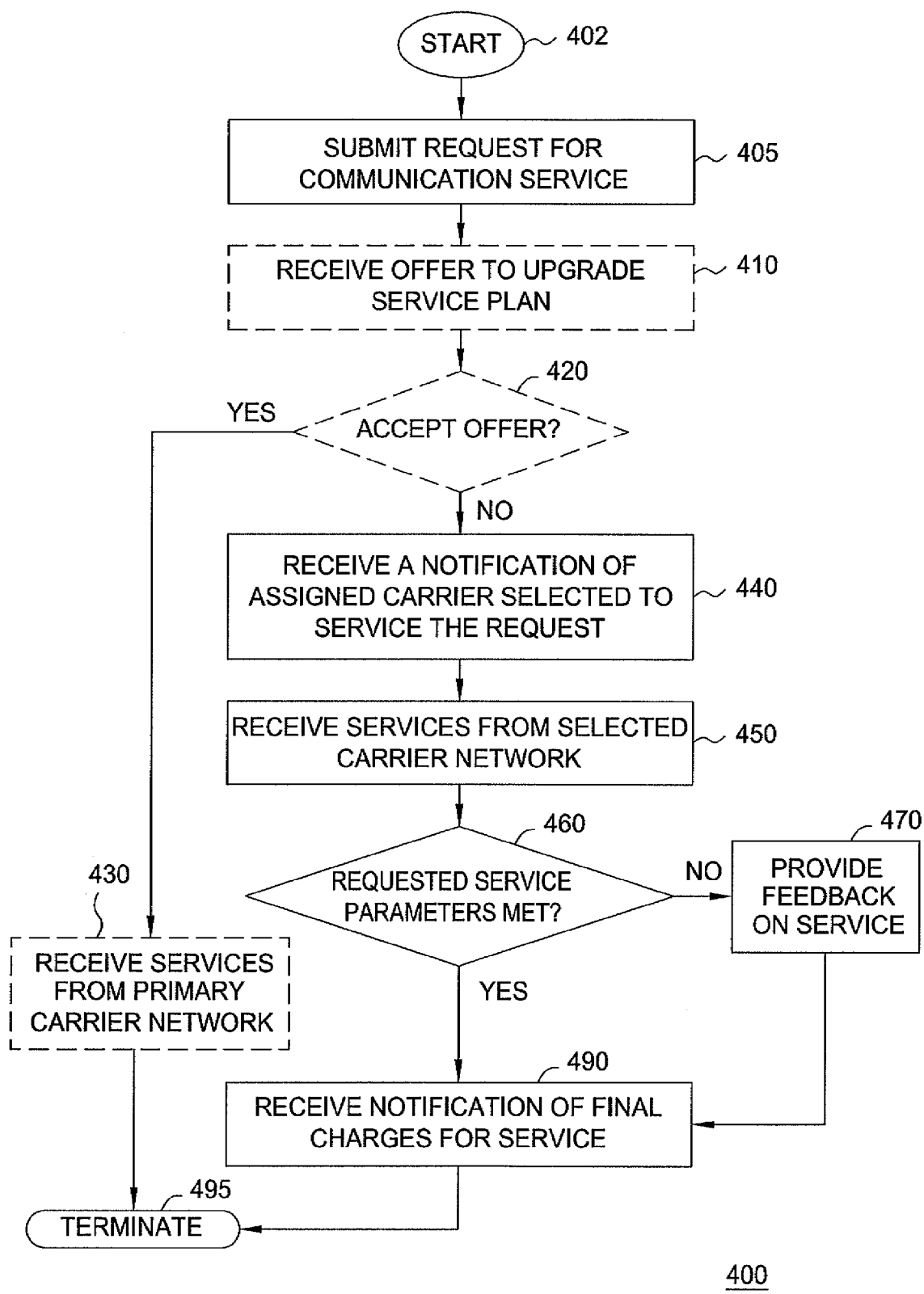
FIG. 4 illustrates a flowchart of a method for submitting a request for wireless service.

FIG. 4 illustrates a flowchart of a method for submitting a request for wireless service, e.g., by an endpoint device. Alternatively, or in addition, one or more steps of the method 400 may be implemented by a general purpose computing device having a processor, a memory and input/output devices as illustrated below in FIG. 5. Thus, the steps of the method 400, for illustrative purposes, will now be described in terms of an embodiment where steps of the method are performed at a mobile device, such as wireless endpoint device 111 in FIG. 1.

The method 400 initializes in step 402 and proceeds to step 405. At step 405, the method 400 submits a communication service request. For example, a user may wish to engage in a communication session with particular requirements. For example, if a user desires to engage in a data communication session, e.g., downloading a streaming live video, the desired communication session may have strict parameters which must be met in order to provide the service. For example a number of parameters/factors, such as the necessary bandwidth, the anticipated duration of the service, and one or more quality of service (QoS) parameters, such as throughput, jitter, maximum latency, error rate, loss ratio, may be provided by a user making a request for a communication session via a mobile device. The user may specify such factors explicitly, e.g., via keypad entries on a mobile device or spoken commands with a voice command function of the mobile device. Alternatively, the method 400 may specify the factors based upon the user demand. For example, the method 400 may automatically specify the minimum requirements necessary based upon the type of communication being requested by the user. For example, where the user is requesting a communication involving streaming video, the method 400 may specify a low maximum latency and high throughput, but provide a greater tolerance with respect to a loss ratio. On the other hand, if the request is for a voice communication session, the method 400 may specify a lower jitter rate and loss ratio, since degradations in these parameters are perceived more acutely by users engaged in voice communications as compared to users who are downloading pictures or video and suffer similar degradations.

In one embodiment, the method 400 transmits the communication service request directly to a coordinating device, such as coordinator 120 in FIG. 1. In another embodiment, the method 400 transmits the communication service request via the user's primary carrier. For example, a user of wireless endpoint device 111 in FIG. 1 may be a subscriber of wireless access network 105A and may be making a communication service request. Accordingly, the method 400 may transmit the communication service request via wireless access network 105A. The communication service request may be ultimately destined for a coordinating device, such as coordinator 120. However, if the communication service request is sent via the primary carrier, the primary carrier may parse the service request and determine if the wireless access network of the primary carrier (e.g., wireless access network 105A) can service the communication request.

Accordingly, at step 410 the method 400 may receive a request to upgrade a service plan. For example, if the method 400 sends a communication service request from the user of mobile endpoint device 111, it may be first observed by the wireless access network 105A (e.g., the wireless access network of the user's primary carrier). In addition, one or more components of wireless access network 105A may be configured to compare the terms of the service request with the terms of the user's service profile. For example, BSC 140A, MSC 160A and/or application server 170A may compare the service request to the user's service profile and determine that the user has not subscribed to the particular level of service being request. However, it may be further determined that wireless access network 105A is capable of servicing the communication request according to its terms, and that the primary carrier is willing to upgrade the user's subscription/service profile to account for the additional level of service required by the current communication request. For example, the wireless access network 105A may review the parameters of the communication service request, such as the type of communication request (e.g., voice, data, streaming video, etc.), the location of the mobile device, the necessary bandwidth, the anticipated duration of the service, and one or more quality of service (QoS) parameters, such as throughput, jitter, maximum latency, error rate, and loss ratio, and may determine that it has the ability to service the request according to the desired parameters. Accordingly, in one embodiment, at step 410 the method 400 receives an offer (e.g., from the user's primary carrier, such as wireless access network 105A) to upgrade the service profile.

At step 420, the method 400 determines whether the offer is accepted. For example, the method 400 may present the offer received from the primary carrier to the user for a selection to either accept or decline the offer. In one embodiment, the method 400 may query the user via an on screen menu or an interactive voice response menu, among other means. If the user accepts the offer, such as by depressing certain keys on a keypad or speaking certain commands in response to voice prompts, the method 400 proceeds to step 430.

At step 430, the method 400 receives the requested communication service from the primary carrier according to the terms of the newly upgraded service profile. Following the receiving of the service at step 430, the method 400 proceeds to step 495 where the method terminates.

If it is determined that the user declines the offer at step 420, the method 400 proceeds to step 440. At step 440, the method 400 receives notification of a carrier (e.g., a wireless access network) selected to service the communication request. For example, the communication service request submitted by the method 400 at step 405 may have been sent to a coordinating device, such as coordinating device 120 in FIG. 1, in order to implement a bidding process to solicit bids from a number of carriers (e.g., wireless access network providers) to service the communication request. For illustrative purposes in describing the exemplary method 400, it is assumed that in response to a submission of a communication service request, a bidding process takes place substantially as described above in connection with the method 200 of FIG. 2.

At step 440, the method 400 receives notification of the carrier selected to service the communication request in response to the submission of the communication service request to the coordinating device for bidding. For instance, coordinator 120 in FIG. 1 may have submitted the communication service request to a number of potentially serving wireless access networks via a bid solicitation. It should be noted that the primary carrier may also have submitted a bid as well. In addition, after collecting a number of bids, coordinator 120 may have determined that wireless access network 105B is the best carrier to service the request. For example, wireless access network 105B may have submitted the lowest cost bid, or submitted the best overall bid based upon a number of criteria. Accordingly, the method 400 may receive a message, e.g., from coordinator 120, indicating the selected carrier to service the communication request (e.g., wireless access network 105B). The message may further indicate the terms of service and the cost.

In one embodiment, the method 400 may optionally have an opportunity to reject the winning bid. For example, even if a carrier submits a lowest cost/winning bid, the terms may still be usurious (e.g., where only a few bids are received, the process may be non-competitive). In one embodiment, the method 400 may provide the terms of the winning bid to the requesting user for acceptance. The user may then respond either accepting or rejecting the offer of the winning bid. The user may indicate to the method 400 that the offer is accepted or rejected by depressing certain keys on a keypad or speaking certain commands in response to voice prompts, for example. Accordingly, the method 400 may respond, e.g., to a coordinating device, such as coordinator 120 in FIG. 1, rejecting or accepting the winning bid. If rejected, the method 400 may skip to step 495 where the method terminates. Of course, if a user is unsatisfied with even the best bid, the user is free to re-characterize the request in another iteration of the method 400. For example, the user could submit a new communication service request with a lower video quality requirement in an effort to obtain lower priced bids from carriers to service a request for streaming video.

If however, the winning bid is accepted by the method 400 at step 440, the user is admitted and the method receives the requested services at step 450. These services are provided by the selected wireless access network of the winning bidder (e.g., user 110 may be admitted and serviced by wireless access network 105B). In one embodiment, the servicing carrier obtains a service profile of the user in order to execute the communication service request. For example, the method 400 may transmit all or a portion of a user service profile and/or device profile to the coordinating device for forwarding to the servicing carrier or may transmit all or a portion of the user service profile directly to the servicing carrier when the servicing carrier is discovered at step 440. For instance, the method 400 may transmit one or more user and/or device identifiers, such as a telephone number, a device serial number, a user ID, etc.

When the method 400 finishes receiving the communication services requested at step 450, the method proceeds to step 460 where the method optionally determines if the requested service parameters have been met. For example, the method 400 may receive a final service report from the servicing carrier upon the completion of the service. In one embodiment, the method 400 receives a final service report directly from the servicing carrier. In another embodiment, the method 400 receives a final service report from a coordinating device (e.g., coordinating device 120 in FIG. 1). In yet another embodiment, the method 400 may determine automatically that the service has ended. For example, the method 400 may begin receiving new communication requests from the same user, or the method 400 may initiate the termination of the services automatically or in response to a user command. Upon receiving a final service report, the method 400 may compare the parameters noted in the report with the parameters requested in the bid solicitation and/or communication service request to determine that the minimum and/or maximum requirements specified in the service request/bid solicitation have been met or exceed. In one embodiment, the method 400 simply receives a pre-computed report that details whether the requested service parameters were met. For example, the method 400 may simultaneously receive a notification from a coordinating device that the service has ended along with a report that indicates that the service parameters either were or were not met.

If the method 400 determines that the requested service parameters were met, the method proceeds to step 490 to receive a final charge for the requested service. For example, the winning bid will have indicated a particular cost for which the winning carrier would service the communication request in accordance with the parameters specified in the bid solicitation. If the service has been provided by the winning carrier in accordance with the terms/parameters, then the carrier is entitled to be compensated according to the terms of the winning bid. In one embodiment, the method 400 may receive a credit/debit message indicating that a payment for services is required or charged to the user's account. For example, in one embodiment a user has a subscription, e.g., a fee subscription for monthly communication services from a primary carrier. The user may agree to pay a flat monthly fee for which the primary carrier guarantees to the user a certain number of minutes of voice/data and/or other communication without any additional fees. However, the agreement may also allow for the user to obtain communications services from other carriers. In addition, the agreement may provide that the primary carrier will perform accounting/settlement with other servicing carriers. The primary carrier may then send a monthly bill to the user that includes, in addition to the flat fee charges, charges for additional services, e.g., including any services obtained from another carrier in accordance with the method 400. Accordingly, the method 400 may receive a credit/debit message indicating that the primary carrier has already compensated the servicing carrier and requesting that user provide payment. The method 400 may, for example, offer to the user the option of charging a credit card on file with the primary carrier, debiting a debit account on file with the primary carrier, debiting a user account with the primary carrier, or adding the charges to the monthly bill, to be paid at a later time. The method 400 may offer such options to the user via an on screen menu or an interactive voice response menu, among other means. The user may then indicate his or her selection by depressing certain keys on a keypad or speaking certain commands in response to voice prompts, for example.

Returning to step 460, if the method 400 determines that the requested service parameters were not met, the method proceeds to step 470 to calculate a billing adjustment. For example, in one embodiment if the requested service parameters are not met, the method 400 may determine that the user should not be charged. Alternatively, or in addition, the method 400 may determine that charges should be reduced, for example where a communication service request is prematurely terminated. In any case, when an adjustment is calculated by the method 400 at step 470, the method proceeds to step 490 where notification of final charges for the service are received (e.g., from a coordinating device, such as coordinator 120 in FIG. 1). For example, the method may receive a credit/debit message (e.g., from the coordinating device) as described above. The credit/debit message may also itemize certain charges and any adjustments. If the adjustment and final charges calculated by the method 400 in step 470 do not match those charges set forth in the credit/debit message, the method 400 may initiate a reconciliation process in order to settle any discrepancies. In one embodiment, for example, the method 400 may initiate an automatic toll-free call to a customer support center of the primary carrier, the servicing carrier, and/or to an entity managing the coordinating device. However, if the method 400 agrees with the final charges received at step 490, the method determines the user's method of payment, as described above, and proceeds to step 495 where the method terminates.

Although steps of the exemplary method 400 have been described as taking place at, or being performed by a mobile device, such as wireless endpoint device 111 in FIG. 1, it should be understood that some or all of the steps may take place at, or be performed by, any other component of the system in FIG. 1. In addition, although not specifically specified, one or more steps of method 400 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 4 that recite a determining operation or involve a decision do not necessarily require that both branches of the determining operation be practiced. In other words, one of the branches of the determining operation can be deemed as an optional step.

Figure 5:
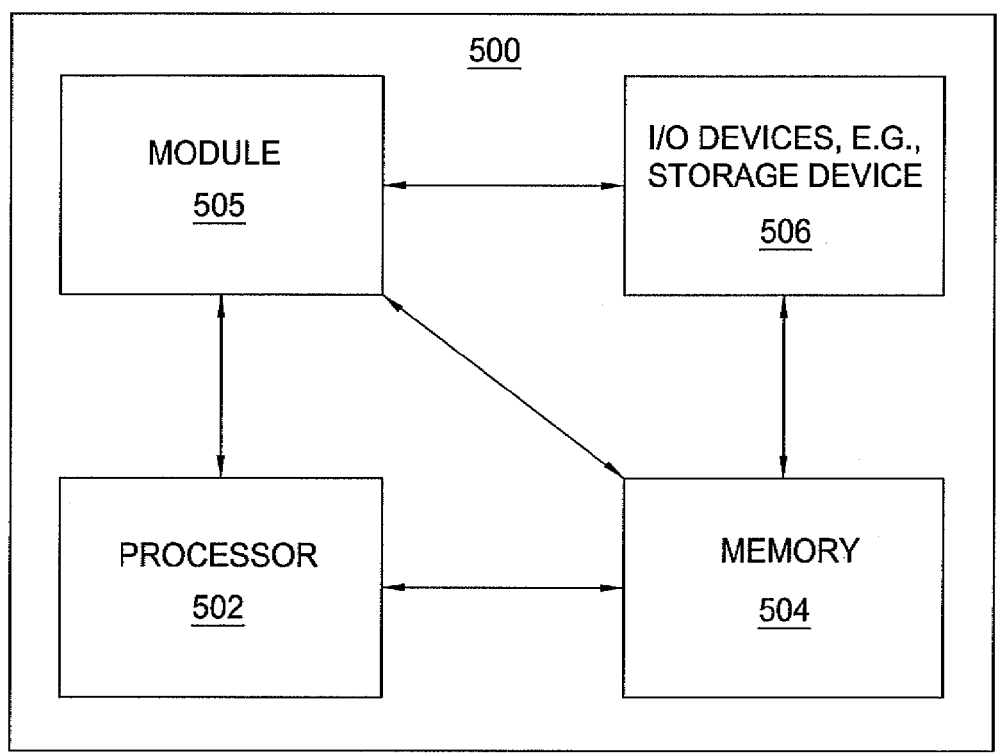
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 providing provider-neutral optimization of spectrum allocation (e.g., implementing method 200, method 300 or method 400 as discussed above), and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 505 providing provider-neutral optimization of spectrum allocation can be loaded into memory 504 and executed by processor 502 to implement the functions as discussed above. As such, the present module or process 505 providing provider-neutral optimization of spectrum allocation (including associated data structures) of the present disclosure can be stored on a non-transistory computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a request for wireless communication service, comprising:
   receiving, by a coordinating device, the request for wireless communication service from a mobile device, wherein the request for wireless communication service includes a required parameter;
   forwarding, by the coordinating device, the request to a plurality of wireless network service providers to solicit at least one bid for servicing the request;
   receiving, by the coordinating device, the at least one bid from the plurality of wireless network service providers to service the request;
   determining, by the coordinating device, a winning bid from the at least one bid;
   assigning, by the coordinating device, a wireless network service provider from the plurality of wireless network service providers to service the request, wherein the assigned wireless network service provider is associated with the winning bid;
   monitoring, by the coordinating device, a wireless communication service provided by the assigned wireless network service provider to the mobile device for compliance with the required parameter;
   sending, by the coordinating device, a notification to the mobile device when the assigned wireless network service provider is not meeting the required parameter; and
   receiving, by the coordinating device, a response from the mobile device to issue another bid.

2. The method of claim 1, wherein the required parameter comprises a quality of service.

3. The method of claim 1, wherein the required parameter comprises a maximum data latency rate.

4. The method of claim 1, further comprising:
   calculating an adjustment if the wireless communication service provided does not comply with the required parameter.

5. The method of claim 1, further comprising:
   billing a primary wireless network service provider of the mobile device for a charge associated with a service provided by the assigned wireless network service provider.

6. The method of claim 5, further comprising:
   crediting the charge to the assigned wireless network service provider in accordance with the winning bid.

7. The method of claim 5, wherein the primary wireless network service provider and the assigned wireless network service provider are different entities.

8. The method of claim 5, wherein the primary wireless network service provider and the assigned wireless network service provider are the same entity.

9. The method of claim 1, further comprising:
   presenting a charge associated with the service to be provided in accordance with the winning bid to a user of the mobile device.

10. The method of claim 9, further comprising:
    proceeding with the assigning of the wireless network service provider to service the request only if the charge is accepted by the user.

11. The method of claim 1, further comprising:
sending a request to the assigned wireless network service provider to take a remedial action if the compliance with the required parameter is not met.

12. The method of claim 1, further comprising:
forwarding the request again to the plurality of wireless network service providers to solicit another bid for servicing the request.

13. A non-transitory computer-readable medium storing instructions which, when executed by a processor, cause the processor to perform operations for processing a request for wireless communication service, the operations comprising:
receiving the request for wireless communication service from a mobile device, wherein the request for wireless communication service includes a required parameter;
forwarding the request to a plurality of wireless network service providers to solicit at least one bid for servicing the request;
receiving the at least one bid from the plurality of wireless network service providers to service the request;
determining a winning bid from the at least one bid;
assigning a wireless network service provider from the plurality of wireless network service providers to service the request, wherein the assigned wireless network service provider is associated with the winning bid;
monitoring a wireless communication service provided by the assigned wireless network service provider to the mobile device for compliance with the required parameter;
sending a notification to the mobile device when the assigned wireless network service provider is not meeting the required parameter; and
receiving a response from the mobile device to issue another bid.

14. The non-transitory computer-readable medium of claim 13, wherein the operations further comprise:
forwarding the request again to the plurality of wireless network service providers to solicit another bid for servicing the request.

15. An apparatus for processing a request for wireless communication service, the apparatus comprising:
a processor; and
a computer-readable medium storing instructions which, when executed by the processor, cause the processor to perform operations, the operations comprising:
receiving the request for wireless communication service from a mobile device, wherein the request for wireless communication service includes a required parameter;
forwarding the request to a plurality of wireless network service providers to solicit at least one bid for servicing the request;
receiving the at least one bid from the plurality of wireless network service providers to service the request;
determining a winning bid from the at least one bid;
assigning a wireless network service provider from the plurality of wireless network service providers to service the request, wherein the assigned wireless network service provider is associated with the winning bid;
monitoring a wireless communication service provided by the assigned wireless network service provider to the mobile device for compliance with the required parameter;
sending a notification to the mobile device when the assigned wireless network service provider is not meeting the required parameter; and
receiving a response from the mobile device to issue another bid.

16. The apparatus of claim 15, wherein the operations further comprise:
forwarding the request again to the plurality of wireless network service providers to solicit another bid for servicing the request.

* * * * *